(12) United States Patent
Keng

(10) Patent No.: US 7,210,821 B2
(45) Date of Patent: May 1, 2007

(54) LIGHT-SPLITTING DEVICE

(75) Inventor: Li-Teng Keng, Taipei (TW)

(73) Assignee: Prodisc Technology Inc., Taipei Hsien (TW)

( * ) Notice: Subject to any disclaimer, the term of this patent is extended or adjusted under 35 U.S.C. 154(b) by 120 days.

(21) Appl. No.: 11/100,502

(22) Filed: Apr. 7, 2005

(65) Prior Publication Data

US 2006/0181233 A1    Aug. 17, 2006

(30) Foreign Application Priority Data

Feb. 16, 2005    (TW) .............................. 94104424 A

(51) Int. Cl.
  *F21V 21/14* (2006.01)
  *G03B 21/14* (2006.01)
(52) U.S. Cl. ........................................ 362/293; 353/84
(58) Field of Classification Search ................ 362/293; 359/618; 349/106, 113; 353/84
See application file for complete search history.

(56) References Cited

U.S. PATENT DOCUMENTS

| 4,843,528 | A  | * | 6/1989 | Pearce-Harvey et al. ... 362/277 |
| 2002/0075685 | A1 | * | 6/2002 | Rasmussen et al. ........ 362/282 |
| 2002/0105808 | A1 | * | 8/2002 | Ting Yup .................... 362/281 |
| 2004/0125602 | A1 | * | 7/2004 | Hunt et al. ................. 362/293 |

* cited by examiner

*Primary Examiner*—Ali Alavi
(74) *Attorney, Agent, or Firm*—Birch, Stewart, Kolasch & Birch, LLP

(57) ABSTRACT

A light-splitting device comprises a filter element, a first transmission element, a second transmission element, and a power element. In this case, the first transmission element is disposed on one side of the filter element. The second transmission element connects with the first transmission element. The power element connects with the second transmission element, wherein the power element drives the rotation of the second transmission element, so that the second transmission element drives the rotation of the fist transmission element and the filter element.

16 Claims, 7 Drawing Sheets

LIGHT-SPLITTING DEVICE

BACKGROUND OF THE INVENTION

1. Field of Invention

The invention relates to a light-splitting device and more particularly to a light-splitting device, which is used in a projection system.

2. Related Art

The projection systems are divided into three types including a liquid crystal display (LCD) type, a liquid crystal on silicon (LCoS) type, and a digital light processing (DLP) type. The DLP type has several advantages, including high brightness, accurate tone reproduction, fast response time, noise-free operation, and thin and light composition. Therefore, the DLP type is one of the most potential projection technologies recently.

In a DLP projector, a digital control method and a light reflection principle are adopted. First, light rays are integrated or converged by a light integration rod and then pass through the color filter of the color wheel, which splits the light rays. The split light rays are then projected onto a digital micro-mirror device (DMD). In this technology, the DMD is used to replace the liquid crystal panel for representing images in the conventional liquid crystal projector. Since the DMD includes several movable micro-mirrors, driving electrodes may control the tilt angle and deflection time of each movable mirror. Then, the light rays may be projected to form an image by switching the reflection directions of the light rays.

As shown in FIG. 1, FIG. 1 is a lateral view that shows a conventional color wheel assembly. The color wheel assembly 1 mainly includes a color filter 11 and a motor 12. The motor 12 has a housing 121 and a motor body 122. The housing 121 is disposed at one side of the motor body 212. Moreover, the color wheel assembly 1 further includes a fixing plate 13 and a flexible printed circuit (not shown). The color wheel assembly 1 is fixed in a projection system with the fixing plate 13, and the flexible printed circuit electrically connects with a driver. The driver drives the motor body 122 to rotate around the central axis. The motor body 122 is mainly composed of a shell, a magnetic ring, a laminated steel stack and a coil. When the current is applied to the coil, the laminated steel stack produces a magnetic force and a magnetic field. Controlling the positive/negative property and the intensity of the flowing current may change the magnetic field in sequence, so as to produce a rotating magnetic field. Accordingly, the magnetic ring can interact with the magnetic field and thus be driven to rotate. The color filter 11 is fixed on the housing 121 of the motor 12 by way of an adhering process. The motor 12 drives the color filter 11 to rotate around the central axis, so that the color filter 11 may split the light. In the current industry, the color filter 11 may be a ring-shaped filter composed of different color sections for setting on the housing 121 of the motor 12. Further, the color filter 11 is adhered to the housing 121 of the motor 12 with an adhesive, and the adhesive needs to be heated to solidify. However, the heat-resistant temperature of the motor 12 is about 80° C., and the motor 12 may be damaged easily during the heating process. Hence, even only one component of the color wheel assembly 1 is damaged, the whole assembly is unusable. Because of the above reason, the production costs would be increased.

Furthermore, in the projection system, the color wheel assembly 1 is near to a light source. Because of the high operation temperature of the light source, the ambient temperature of the color wheel assembly 1 would also be increased. The heat-resistant temperature of the adhesive is about 150° C. to 180° C., and the operation temperature of the light source is about 150° C. to 200° C. The adhesive is easily fragile under 150° C. to 200° C., so that the adhesion force between the color filter 11 and the motor 12 would be decreased. In general, because the motor 12 for the color wheel assembly 1 rotates at a speed higher than 7200 rpm, the centrifugal force of one section of the color filter 11 is very high. Hence, in this ambient temperature, the rotation center of the color filter 11 is easily away from the central axis of the rotation shaft, and the color filter 11 may produce displacement easily. Further, the reliability of the product would be decreased.

It is therefore a subjective of the invention to provide a light-splitting device to solve the above-mentioned problems.

SUMMARY OF THE INVENTION

In view of the foregoing, the invention is to provide a light-splitting device, which can solve the above-mentioned problems.

To achieve the above, a light-splitting device of the invention comprises a filter element, a first transmission element, a second transmission element, and a power element. In this case, the first transmission element is disposed on one side of the filter element. The second transmission element connects with the first transmission element. The power element connects with the second transmission element, wherein the power element drives the rotation of the second transmission element, so that the second transmission element drives the rotation of the fist transmission element and the filter element.

To achieve the above, a light-splitting device of the invention comprises a filter element, a first transmission element, a second transmission element, an auxiliary transmission element and a power element. In this case, the first transmission element is disposed on one side of the filter element. The second transmission element is disposed adjacent to the first transmission element. The auxiliary transmission element connects the first transmission element and the second transmission element. The power element connects with the second transmission element, wherein the power element drives the rotation of the second transmission element and the auxiliary transmission element, so that the auxiliary transmission element drives the rotation of the fist transmission element and the filter element.

As mentioned above, in the light-splitting device of the invention, the power element drives the rotation of the second transmission element, so that the second transmission element drives the rotation of the first transmission element and the filter element for splitting the light. Hence, if one component of the light-splitting device is damaged, the damaged component can be changed independently. Further, because the components of the light-splitting device can be changed independently, the production costs would be decreased.

BRIEF DESCRIPTION OF THE DRAWINGS

The invention will become more fully understood from the detailed description given hereinbelow illustration only, and thus is not limitative of the present invention, and wherein.

DETAILED DESCRIPTION OF THE INVENTION

The light-splitting device in accordance with preferred embodiments of the invention will be described with reference to the accompanying drawings.

Figure 1:
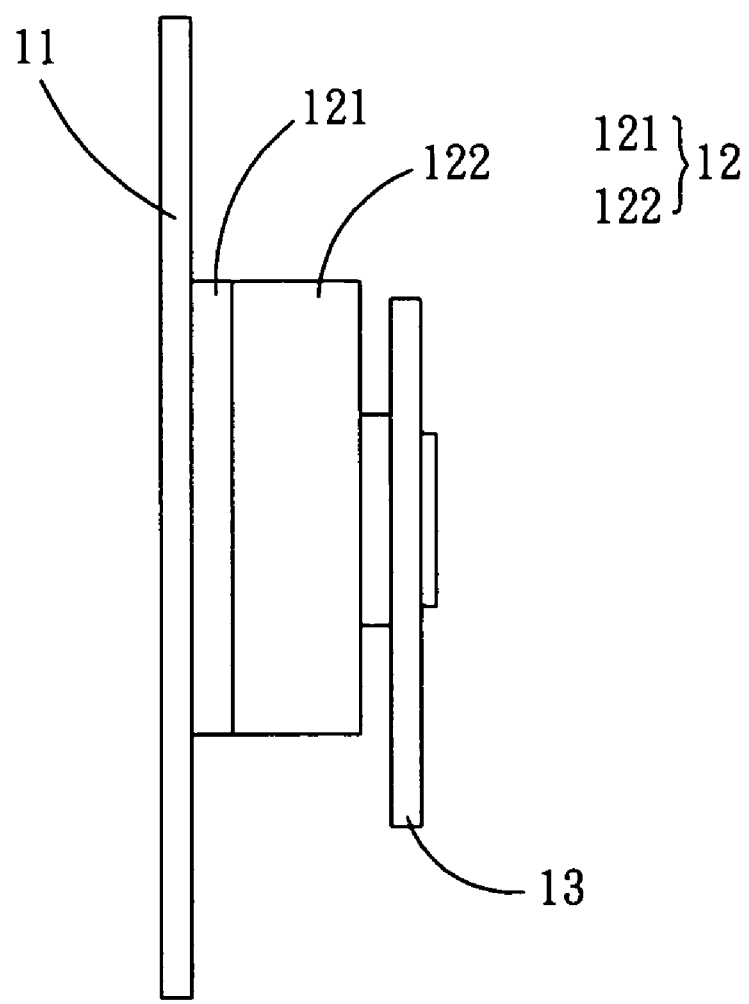
FIG. 1 is a schematic illustration that shows a side view of a conventional color wheel assembly.
Figure 2:
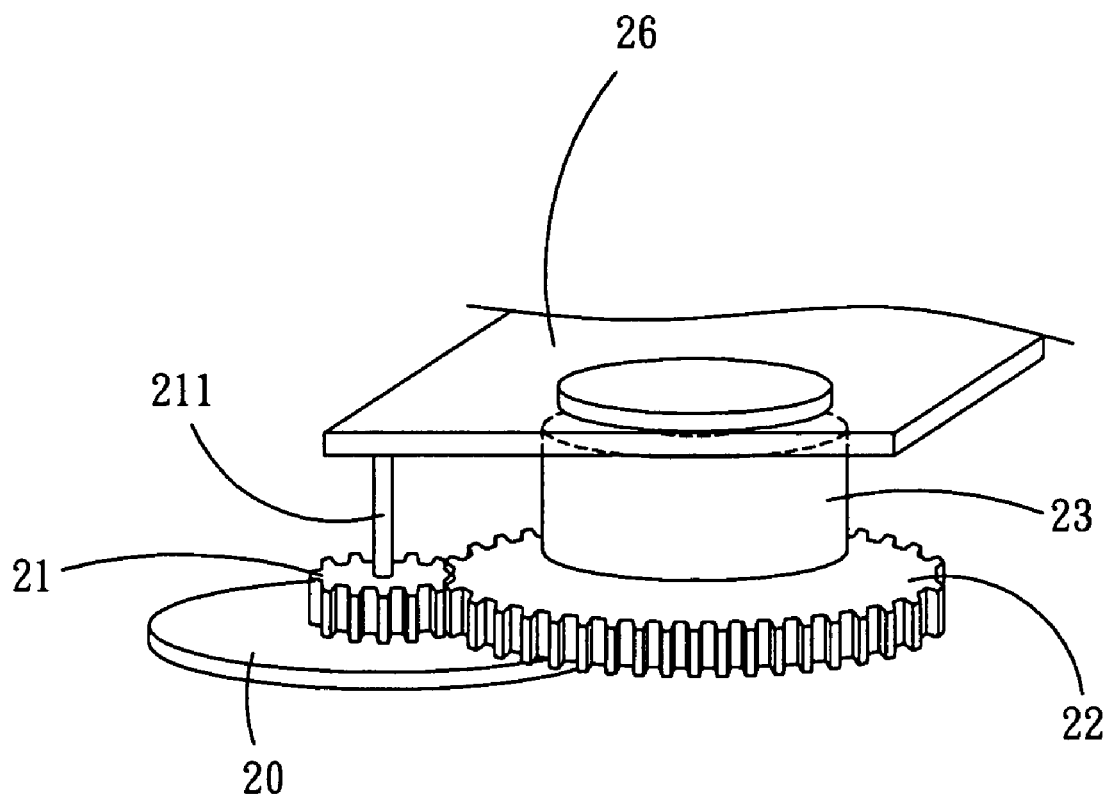
FIG. 2 is a schematic illustration that shows a perspective view of a light-splitting device in accordance with a first embodiment of the invention.
Figure 3:
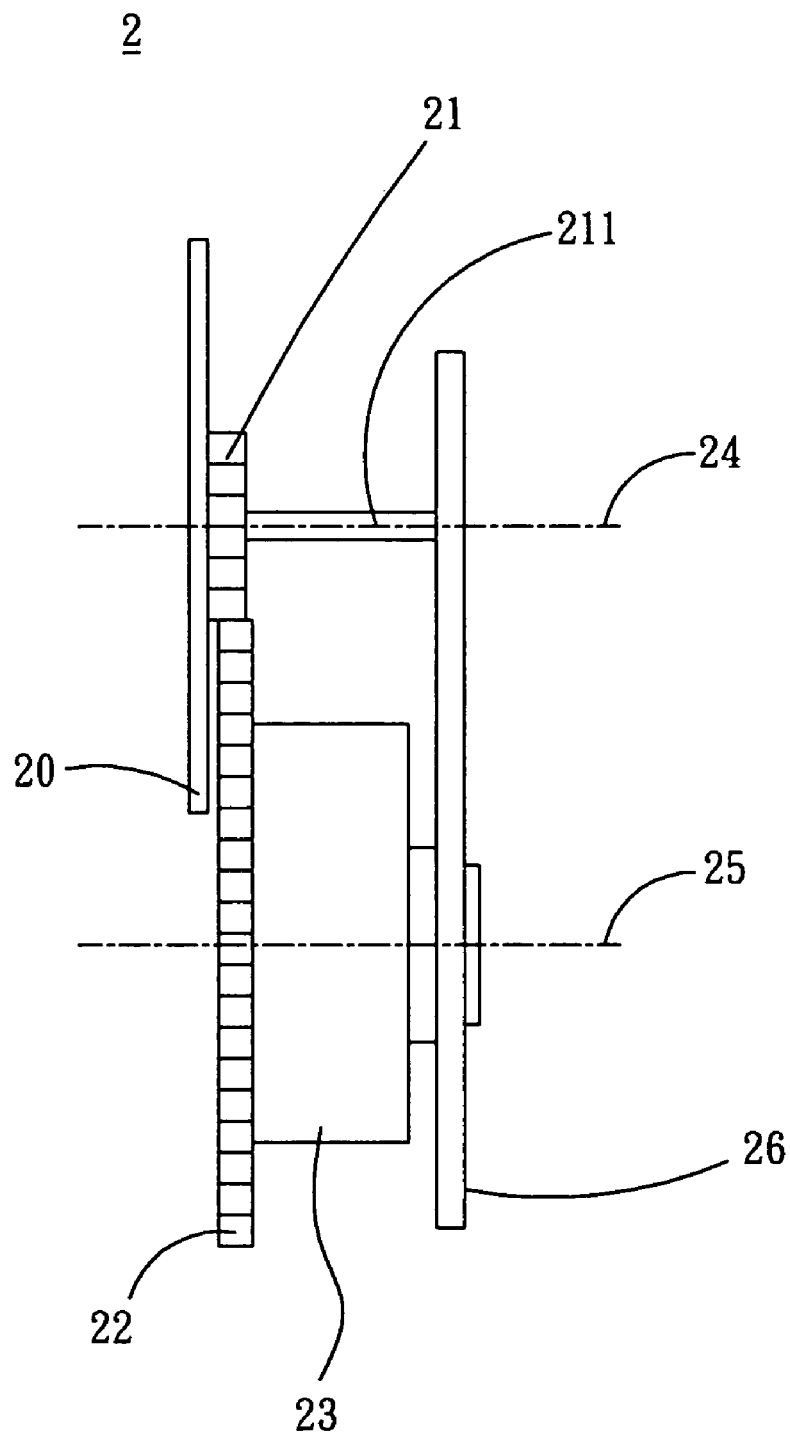
FIG. 3, FIG. 4 and FIG. 5 are schematic illustrations that show side views of a light-splitting device in accordance with the first embodiment of the invention.

Please refer to FIG. 2 and FIG. 3, a light-splitting device 2 according to a first embodiment of the invention includes a filter element 20, a first transmission element 21, a second transmission element 22, and a power element 23.

In the current embodiment, the filter element 20 may a filter having at least two color sections. Further, the filter element 20 may be a circular filter or a ring-shaped filter composed of a red section, a green section, and a blue section. Alternatively, the filter element 20 also may be a ring-shaped filter composed of red sections, green sections and blue sections, or a circular filter composed of red sections, green sections, blue sections, and transparent sections. Of course, the filter element 20 also may be a ring-shaped transparent plate or a circular transparent plate, on which at least a red film, at least a green film, and at least a blue film are formed.

The first transmission element 21 of the embodiment is disposed on one side of the filter element 20. The first transmission element 21 is adhered to the filter element 20 with an adhesive. In the current embodiment, the first transmission element 21 may be a gear.

The second transmission element 22 connects with the first transmission element 21. In the current embodiment, the second transmission element 22 may be a gear. The first transmission element 21 and the second transmission element 22 are in mesh. Moreover, in the current embodiment, number of teeth in the second transmission element 22 may be more than number of teeth in the first transmission element 21. Of course, the ratio of the number of teeth in the first transmission element 21 to the number of teeth in the second transmission element 22 may be adjustable by the real needs. Also, the number of teeth in the second transmission element 22 may be less than the number of teeth in the first transmission element 21. More, the number of teeth in the second transmission element 22 may be equal to the number of teeth in the first transmission element 21. Herein, in the current embodiment, the number of teeth in the second transmission element 22 may be three times of the number of teeth in the first transmission element 21. One turn of the second transmission element 22 produces three turns of the first transmission element 21. Hence, the first transmission element 21 and the second transmission element 22 may change the rotation speed. When the power element 23 rotates at a lower speed, the filter element 20 may rotates at a high speed. For example, 3800 turns of the power element 23 produces 10800 turns of the filter element 20. Hence, the problem about high temperature of the power element 23 would be prevented.

Please refer to FIG. 3 again, the power element 23 may be a motor. The power element 23 connects with the second transmission element 22. The second transmission element 22 may be set on the power element 23 by way of an adhesive process or a screw method. The power element 23 drives the rotation of the second transmission element 22, so that the second transmission element 22 drives the rotation of the fist transmission element 21 and the filter element 20 for splitting the light.

Figure 4:
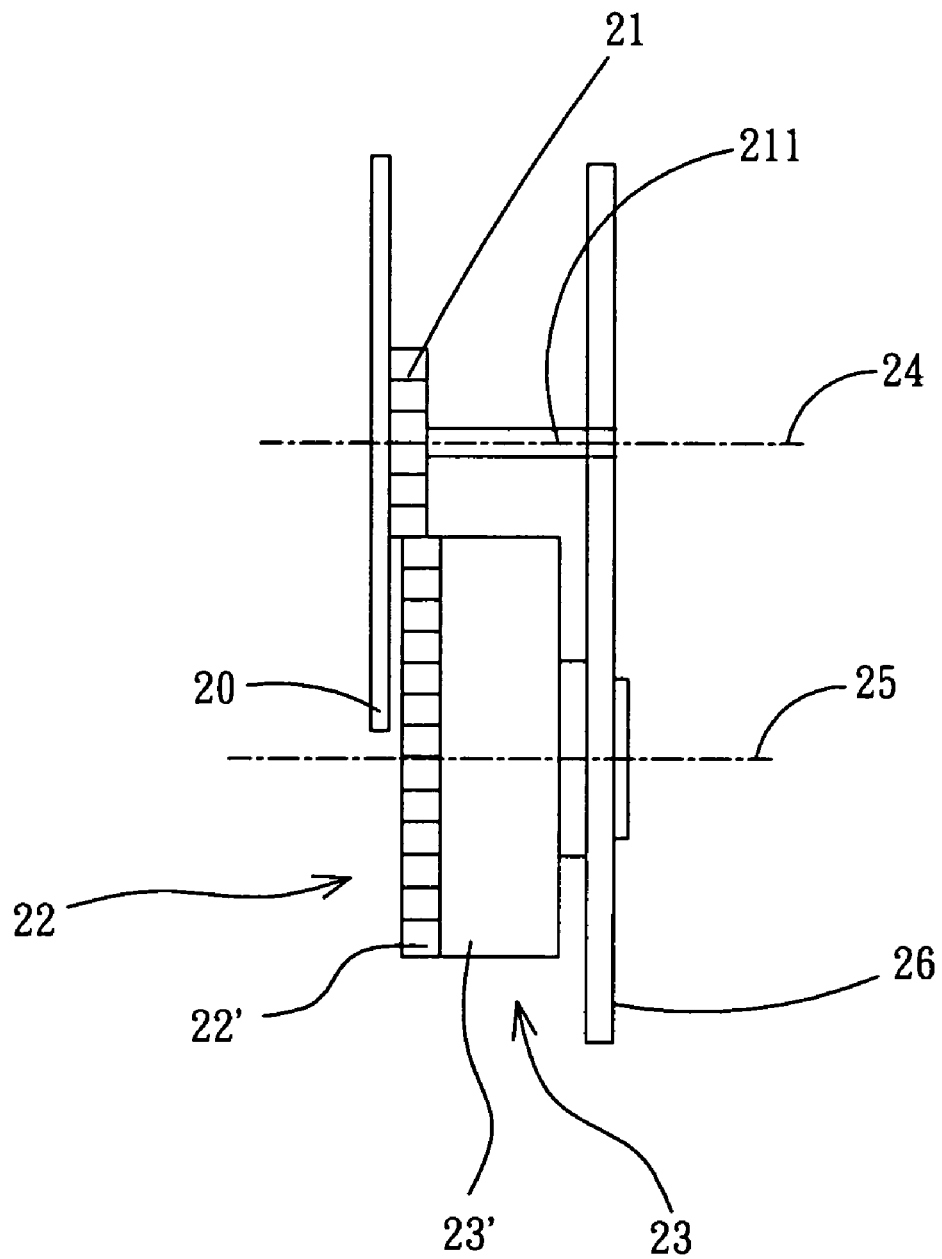

Please refer to FIG. 4, the power element 23 may be the motor, and the motor mainly includes a motor body 23'. The second transmission element 22 may be a housing 22', and the housing 22' is disposed on the motor body 23'. Herein, the housing 22' has a plurality of gear teeth. The first transmission element 21 and the second transmission element 22 are in mesh. The motor body 23' drives the rotation of the housing 22', so that the housing 22' drives the rotation of the first transmission element 21 and the filter element 20.

In the current embodiment, the first transmission element 21 is coupled to a first rotating shaft 24, and the second transmission element 22 is coupled to a second rotating shaft 25. The first rotating shaft 24 and the second rotating shaft 25 are different. Hence, the light emitted from a light source mainly passes through the filter element 20, and the light wouldn't emit to the power element 23. So, the temperature of the power element 23 wouldn't be increased. Furthermore, compare to the prior art, the filter element 20 doesn't fix on the power element 23 directly. Hence, if one component of the light-splitting device 2 is damaged, the damaged component can be changed independently. Because the filter element 20 and the power element 23 can be changed independently, the production costs would be decreased.

Please refer to FIG. 3 again, the light-splitting device 2 of the embodiment further includes a fixing plate 26. The motor body 232 is disposed between the housing 231 and the fixing plate 26. The first transmission element 21 is disposed on the fixing plate 26 by a shaft 211. The fixing plate 26 connects electrically with a driver (not shown) through a flexible printed circuit (not shown). The driver drives the motor body 232 to rotate around the central axis. Further, when the light-splitting device 2 is used in a projection system, the fixing plate 26 may be one part of the casing of the system or other fixing elements.

Figure 5:
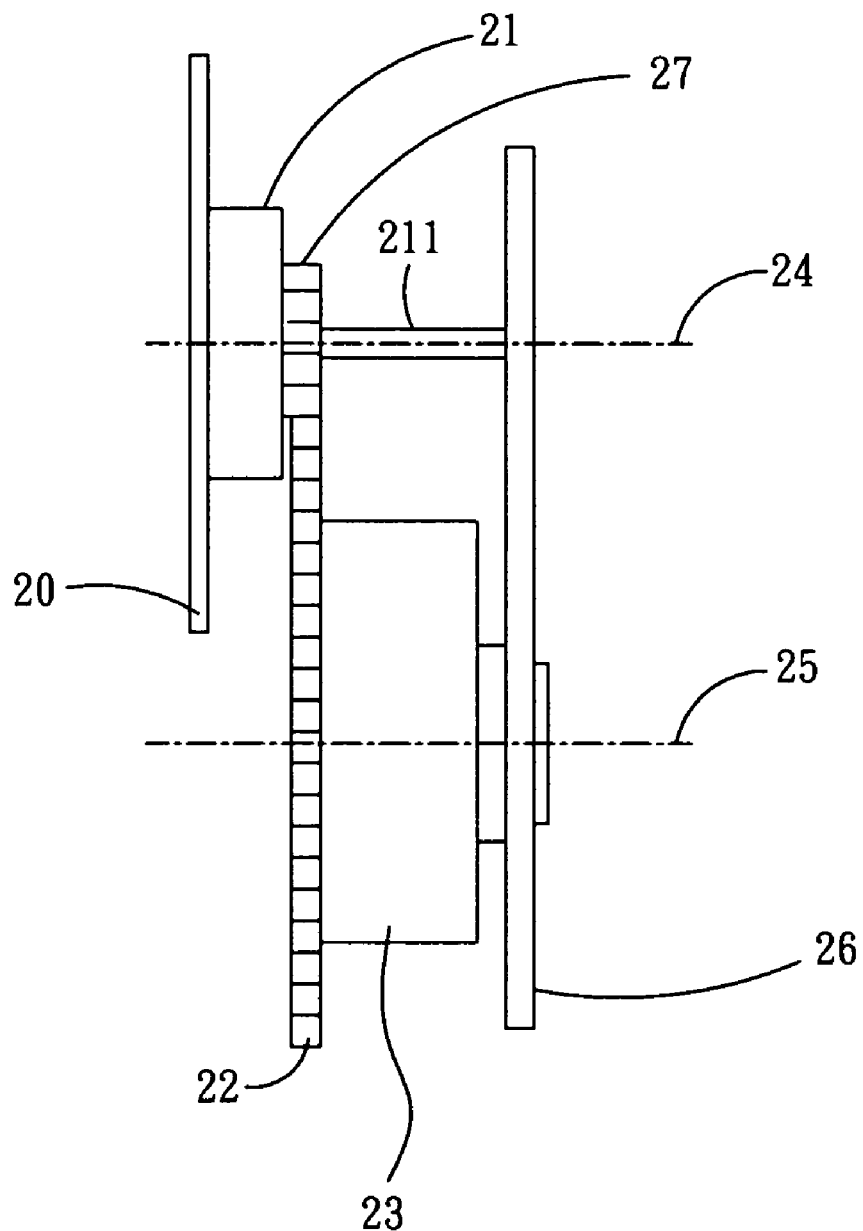

Moreover, the light-splitting device 2 of the embodiment further includes a carrier 27. The carrier 27 is set between the filter element 20 and the first transmission element 21, as shown in FIG. 5.

Figure 6:
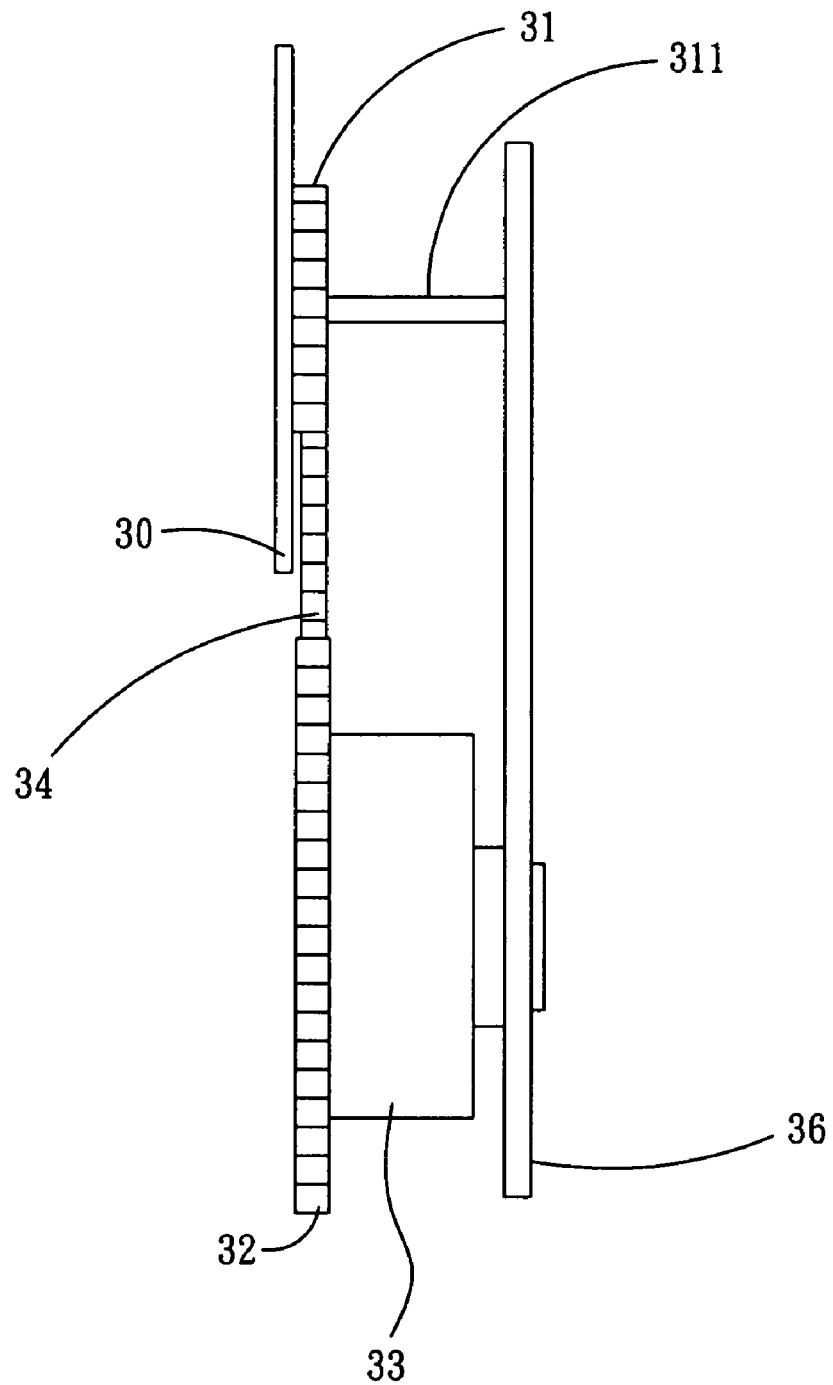
FIG. 6 is a schematic illustration that shows a side view of a light-splitting device in accordance with a second embodiment of the invention.

Please refer to FIG. 6, a light-splitting device 3 of a second embodiment includes a filter element 30, a first transmission element 31, a second transmission element 32, a power element 33 and an auxiliary transmission element 34. The features and the functions of filter element 30, the first transmission element 31, the second transmission element 32, the power element 33 in this embodiment are the same to the filter element 20, the first transmission element 21, the second transmission element 22, the power element 23 in FIG. 2, so the detailed descriptions thereof are omitted for concise purpose. Herein, the second transmission element 32 is disposed adjacent to the first transmission element 31. The auxiliary transmission element 34 connects the first transmission element 31 and the second transmission element 32. In the current embodiment, the auxiliary transmission element 34 may be a gear. The first transmission element 31 and the auxiliary transmission element 34 are in mesh, and the second transmission element 32 and the auxiliary transmission element 34 are in mesh. The power element 33 connects with the second transmission element 32. When the power element 33 drives the rotation of the second transmission element 32 and the auxiliary transmission element 34, so that the auxiliary transmission element 34 drives the rotation of the fist transmission element 31 and the filter element 30.

Furthermore, the auxiliary transmission element 34 may also be a chain (not shown). The chain is set around the first transmission element 31 and the second transmission element 32. When the power element 33 drives the rotation of the second transmission element 32, the chain drives the rotation of the first transmission element 31 and the filter element 30.

Figure 7:
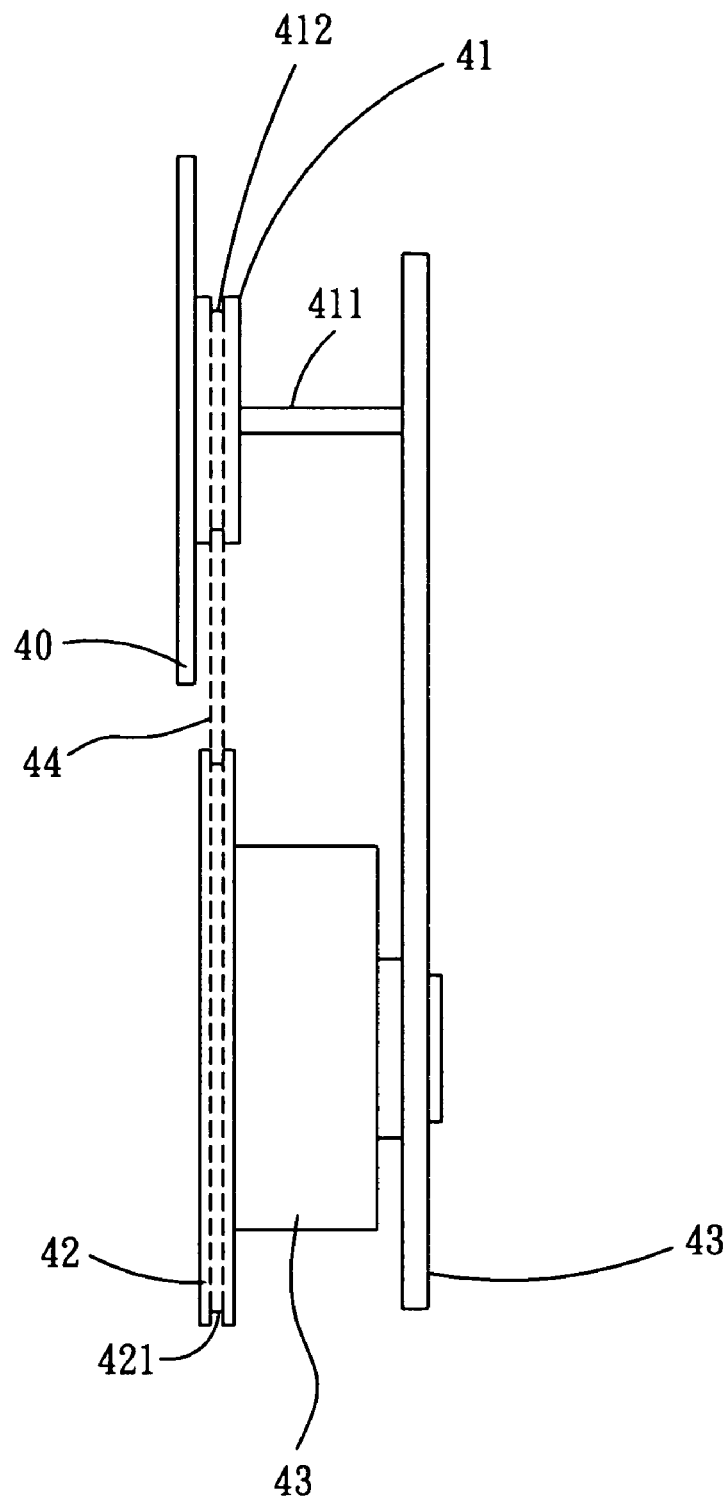
FIG. 7 is a schematic illustration that shows a side view of a light-splitting device in accordance with a third embodiment of the invention.

Please refer to FIG. 7, a light-splitting device 4 of a third embodiment includes a filter element 40, a first transmission element 41, a second transmission element 42, a power element 43 and an auxiliary transmission element 44. Herein, The features and the functions of the filter element 40, the first transmission element 41, the second transmission element 42, the power element 43 in this embodiment are the same to the filter element 20, the first transmission element 21, the second transmission element 22, the power element 23 in FIG. 2, so the detailed descriptions thereof are omitted for concise purpose.

In the current embodiment, the first transmission element 41 and the second transmission element 42 may be rollers. The first transmission element 41 has a first groove 411, and the second transmission element 42 has a second groove 421. In the current embodiment, the auxiliary transmission element 44 may be a belt, and the belt is set around the first transmission element 41 and the second transmission element 42. The auxiliary transmission element 44 is set in the first groove 411 and the second groove 421. The auxiliary transmission element 44 is set in the first groove 411 and the second groove 421. When the power element 43 drives the rotation of the second transmission element 42 and the belt, the belt drives the rotation of the first transmission element 41 and the filter element 40. Further, because the radius of the second transmission element 42 is larger than the radius of the first transmission element 41, it may change the rotation speed.

As mentioned above, in the light-splitting device of the invention, the power element drives the rotation of the second transmission element, so that the second transmission element drives the rotation of the first transmission element and the filter element for splitting the light. Further, the ratio of the number of teeth in the first transmission element to that in the second transmission element or the ratio of the radius of the first transmission element to that of the second transmission element could be changed, the high temperature caused by high rotation speed of the motor would be prevented. Compare to the prior art, the filter element 20 doesn't connect with the power element directly. Hence, if one component of the light-splitting device is damaged, the damaged component can be changed independently. Further, because the components of the light-splitting device can be changed independently, the production costs would be decreased.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A light-splitting device, comprising:
   a filter element;
   a first transmission element disposed on one side of the filter element;
   a second transmission element connecting with the first transmission element; and
   a power element connecting with the second transmission element, wherein the power element drives the rotation of the second transmission element, so that the second transmission element drives the rotation of the first transmission element and the filter element.

2. The light-splitting device according to claim 1, wherein the filter element is a filter having at least two color sections.

3. The light-splitting device according to claim 1, wherein the power element is a motor.

4. The light-splitting device according to claim 1, wherein the first transmission element is a gear and the second transmission element is a gear.

5. The light-splitting device according to claim 4, wherein number of teeth in the second transmission element is more than number of teeth in the first transmission element.

6. The light-splitting device according to claim 1, wherein the power element is a motor having a motor body, the second transmission element is a housing, the housing is disposed on the motor body and the housing has a plurality of gear teeth.

7. A light-splitting device, comprising:
   a filter element;
   a first transmission element disposed on one side of the filter element;
   a second transmission element disposed adjacent to the first transmission element;
   an auxiliary transmission element connecting the first transmission element and the second transmission element; and
   a power element connecting with the second transmission element, wherein the power element drives the rotation of the second transmission element and the auxiliary transmission element, so that the auxiliary transmission element drives the rotation of the first transmission element and the filter element.

8. The light-splitting device according to claim 7, wherein the filter element is a filter having at least two color sections.

9. The light-splitting device according to claim 7, wherein the first transmission element is a gear and the second transmission element is a gear.

10. The light-splitting device according to claim 9, wherein the auxiliary transmission element is a gear.

11. The light-splitting device according to claim 9, wherein the auxiliary transmission element is a chain.

12. The light-splitting device according to claim 9, wherein number of teeth in the second transmission element is more than number of teeth in the first transmission element.

13. The light-splitting device according to claim 7, wherein the first transmission element is a roller and the second transmission element is a roller.

14. The light-splitting device according to claim 13, wherein the auxiliary transmission element is a belt.

15. The light-splitting device according to claim 7, wherein the power element is a motor.

16. The light-splitting device according to claim 7, wherein the power element is a motor having a motor body, the second transmission element is a housing, the housing is disposed on the motor body and the housing has a plurality of gear teeth.

* * * * *